March 1, 1955 — D. L. TAPP — 2,703,234
MEANS FOR RESTORING THE STRENGTH TO WEAKENED COIL SPRINGS
Filed Jan. 2, 1953
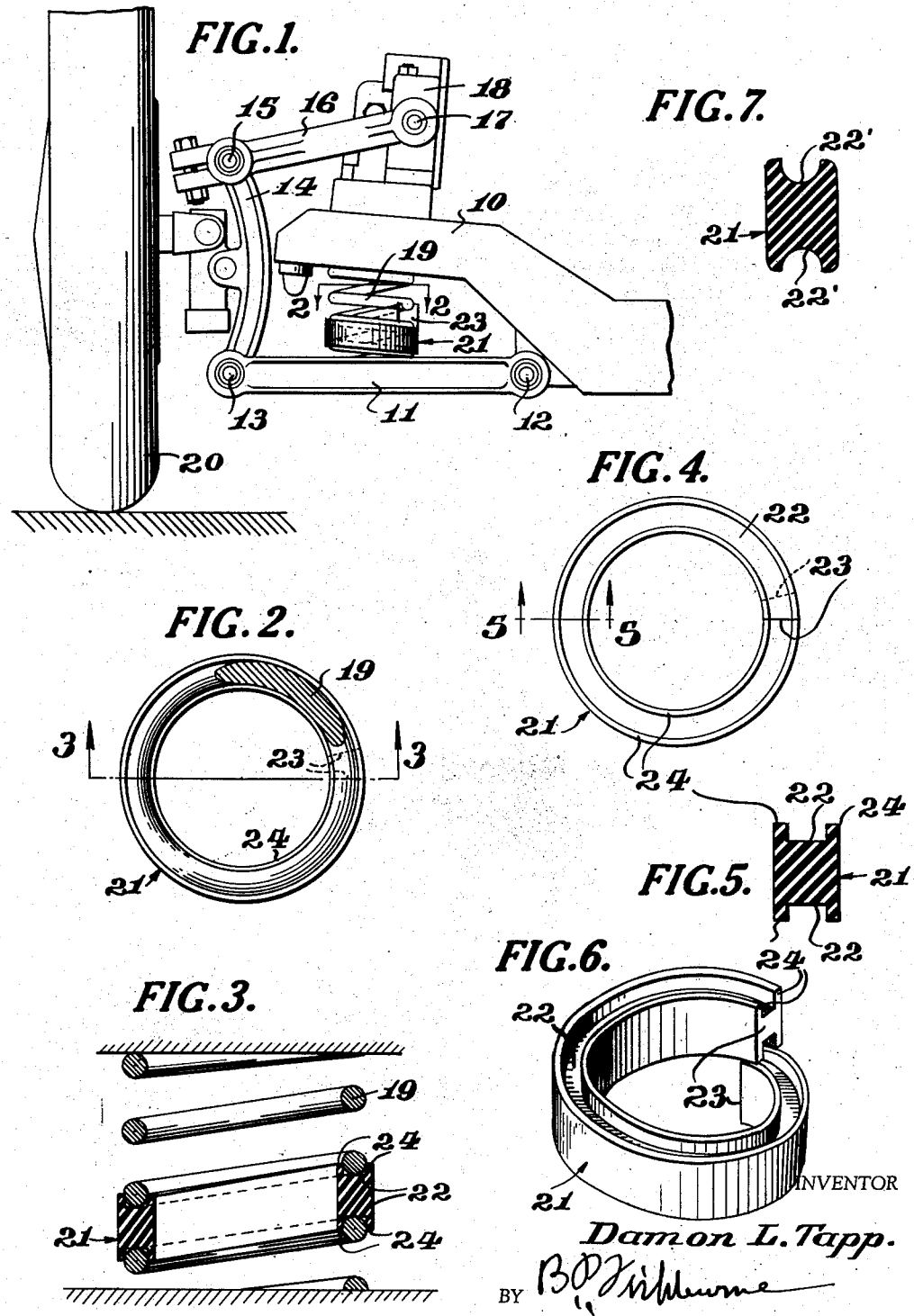

United States Patent Office 2,703,234
Patented Mar. 1, 1955

2,703,234

MEANS FOR RESTORING THE STRENGTH TO WEAKENED COIL SPRINGS

Damon L. Tapp, Plymouth, Ind.

Application January 2, 1953, Serial No. 329,228

1 Claim. (Cl. 267—33)

My invention relates to means for restoring the front wheel suspension mechanism of an automobile to normal operating condition, after it has become out of adjustment due to wear.

A primary object of the invention is to provide a highly simplified and inexpensive one-piece attachment for restoring the tension or life to the front wheel coil springs of automobiles, after the same weaken and lose some of their springiness due to use.

A further object is to provide an attachment of the above-mentioned character, which will restore the front end of the automobile to its normal height, automatically assuring proper camber adjustment, and thus prevent hard steering and excessive tire wear due to improper wheel alignment, save the expensive replacement of the coil springs and restore the wheel suspension mechanism to its normal state, so that it may function as when new.

A further object is to provide a spring attachment formed of rubber or the like which will check the downward stroke or compression of the spring but not hinder its expanding action.

A further object is to provide a coil spring strengthening element which may be readily applied to the spring without separate attaching or fastening means, the element remaining fixed or stationary in use and being completely noiseless during the operation of the wheel suspension mechanism.

Other objects and advantages of the invention will be apparent during the course of the following description.

In the accompanying drawings, forming a part of this application, and in which like numerals are employed to designate like parts throughout the same, Figure 1 is a fragmentary front elevation of an automobile front wheel suspension mechanism equipped with the means embodying the invention.

Figure 2 is an enlarged horizontal cross section on line 2—2 of Figure 1, parts omitted.

Figure 3 is a transverse vertical section on line 3—3, of Figure 2.

Figure 4 is a plan view of my spring strengthening attachment or means removed.

Figure 5 is an enlarged vertical section on line 5—5 of Figure 4.

Figure 6 is a perspective view of the attachment, and,

Figure 7 is a cross sectional view similar to Figure 5, showing a slight modification of the invention.

In the drawings, where for the purpose of illustration are shown preferred embodiments of the invention, attention is directed first to Figures 1 to 6 inclusive, wherein the numeral 10 designates a main automobile front wheel suspension cross arm, forming a part of the chassis main frame and extending transversely of the chassis. A lower knee-action arm 11 is hingedly connected at 12 to the cross arm 10, and adapted to swing vertically. The outer end of the arm 11 is hingedly connected at 13 to a generally vertical steering knuckle support link 14, the upper end of which is hinged at 15 to an upper knee action arm 16. The upper arm 16 is adapted to swing vertically and has its inner end hingedly connected at 17 to a shock absorber mechanism 18, in turn rigidly mounted upon the cross arm 10. A compressible coil spring 19 has its lower end seated upon the lower knee action arm 11, and its upper end engages the cross arm 10, as shown. When the adjacent wheel 20 strikes a bump or the like, the lower knee action arm 11 swings upwardly, and the coil spring 19 is compressed. The parts thus far described constitute a conventional front wheel suspension or knee action mechanism.

When the automobile has been driven for some time, the coil spring 19 loses part of its life or tension. This causes the front end of the automobile to move closer to the ground or sag. Also, front wheel alignment and camber are disturbed, causing difficult steering and excessive tire wear. One way to remedy this is to replace the worn spring 19 on both sides of the automobile with a new one, but this is quite costly, and can be avoided by the use of the means embodying my invention.

My attachment or means comprises a one-piece section or coil 21 of hard rubber, synthetic rubber or the like. The density or hardness of the rubber employed is preferably such that the coil or ring 21 is a good deal stiffer or harder than the tread portion of a conventional automobile tire. However, the hardness of the rubber is not extremely critical, and may be varied somewhat, as found desirable.

The one piece rubber coil or ring 21 is rectangular in cross section, and provided in its upper and lower longitudinal edges with continuous or uninterrupted longitudinal grooves 22, which may be rectangular as shown in Figure 5, and extending throughout the entire length of the coil or ring.

The coil 21 is preformed or molded to be circular, and the coil is split or severed at one point to form ends 23, through which the grooves 22 open. The length of the rubber coil 21 is such that it may extend entirely about the circumference of the spring 19, with its ends 23 overlapped slightly, Figures 2 and 4, thus providing an adequate bearing or support for the spring, about its entire circumference. The radial width or thickness of the rubber coil 21 is somewhat greater than the thickness of the wire forming the spring 19, and the axial or vertical thickness of the rubber coil is preferably about equal to the pitch of the spring 19, or distance between its adjacent coils when assembled as a part of the mechanism shown in Figure 1. The arrangement of the grooves 22 forms relatively narrow longitudinal flanges or ribs 24, extending longitudinally throughout the entire length of the coil 21.

The rubber coil or ring 21 although formed of rubber which is quite hard, is not rigid and may be flexed to permit application of the same to the coil spring 19. The preformed relaxed or free position of the rubber coil 21 is illustrated in Figure 6, showing the helical shape of the rubber coil.

When applying the rubber coil 21 to the spring 19, the coil is merely stretched open by separating the ends 23, and passed about the outside of the spring 19 adjacent to its lowermost coils. The rubber coil 21 may now be pressed or snapped into place between the lower two coils of the spring 19, the inside narrow flanges 24 yielding or flexing to permit the passage of the spring coils into the grooves 22. The flanges 24 are naturally more flexible than the thicker body portion of the rubber coil 21, and will readily fold over or yield to permit the passage of the spring coils into the grooves. The entire rubber coil 21 is, of course, resilient, although quite hard or dense, as previously stated.

Once the rubber coil 21 has been arranged between two adjacent coils of the spring 19, it will not move or become detached from the spring, as the spring is compressed and expanded.

The resilient flanges 24 tend to grip the spring coils and are stiff enough to hold the rubber coil firmly attached to the spring 19. The rubber coil will not move longitudinally upon the spring due to friction between it and the adjacent coils of the spring. As best shown in Figure 2, the rubber coil 21 extends about the entire circumference of the spring 19 and has its ends 23 overlapped slightly. This effects a proper bearing or support between the two coils of the spring to which the rubber coil 21 is applied.

In use, the rubber coil 21 functions as a stiff yet slightly resilient spacer between the two lowermost coils of the spring 19, and has the effect of strengthening the worn spring by blocking out or choking the action of the lowermost coils. The rubber coil thus checks the downward stroke or compression of the spring 19, and thereby strengthens it, but does not interfere in the slightest with the expansion of the spring. The inherent resiliency of the rubber coil 21 is not relied upon to strengthen the spring 19, but rather the same serves to render inactive the last two coils of the spring 19 when the spring is compressed, and this, of course, has the effect of rendering the spring 19 stiffer or stronger in compression, and compensates for the weakness of the spring induced by constant use.

I wish to again emphasize that no separate fasteners are required for attaching the rubber coil 21 to the spring 19, and the same may be applied to the spring with a minimum of expense and labor. I also wish to emphasize that the rubber coil is absolutely noiseless.

In Figure 7, I have shown a slight modification in the formation of the rubber coil 21, in that the longitudinal grooves 22 in the top and bottom longitudinal edges of the rubber coil are circular or arcuate in cross section, rather than rectangular. Otherwise, the rubber coil 21 is identical to the rubber coil shown and described in connection with the first form of the invention. The purpose of the arcuate grooves 22 is to better conform to the cross sectional shape of the wire forming the spring 19.

It is to be understood that the forms of the invention, herewith shown and described are to be taken as preferred examples of the same, and that various changes in the shape, size and arrangement of parts may be resorted to, without departing from the spirit of the invention or scope of the subjoined claim.

Having thus described my invention, I claim:

Means for restoring the strength to a weakened knee action coil spring comprising a one piece split ring formed of rubber which is substantially harder than the rubber of an automobile tire casing, the rubber ring being severed substantially radially and having free ends adapted to overlap slightly circumferentially, the rubber ring being provided in its top and bottom longitudinal faces with continuous longitudinal grooves which extend circumferentially throughout its entire length and open through the free ends of the rubber ring, said grooves forming upon the rubber ring relatively narrow continuous inner and outer marginal flanges extending circumferentially throughout the entire length of the rubber ring between its free ends, the rubber ring and flanges being sufficiently resilient to permit insertion of the rubber ring between a pair of adjacent coils of the coil spring and removal of the rubber ring from the coil spring, said adjacent coils being received by the grooves in the top and bottom races of the rubber ring and held therein by said flanges, so that the rubber ring is held concentric with the coil spring, the rubber ring extending between a pair only of the coils of the coil spring and circumferentially of the pair of coils for their entire circumferences, the free ends of the rubber ring overlapping slightly when the ring is applied to the coils, the rubber ring being free of permanent attachment to the coil spring and readily removable therefrom.

References Cited in the file of this patent

UNITED STATES PATENTS

| | | |
|---|---|---|
| 1,679,698 | Weydert | Aug. 7, 1928 |
| 2,204,988 | Haltenberger | June 18, 1940 |
| 2,621,918 | Tapp | Dec. 16, 1952 |

FOREIGN PATENTS

| | | |
|---|---|---|
| 497,051 | Great Britain | Dec. 12, 1938 |